July 27, 1965  F. C. SCHMIDT  3,197,586
TURN SIGNAL DEVICE HAVING A PAIR OF LATCHES EACH HAVING
TWO PROJECTIONS ENGAGEABLE WITH CORRESPONDING NOTCHES
AND A LATCH CAM ENGAGEABLE WITH A RELEASE CAM
Filed May 20, 1963  2 Sheets-Sheet 1
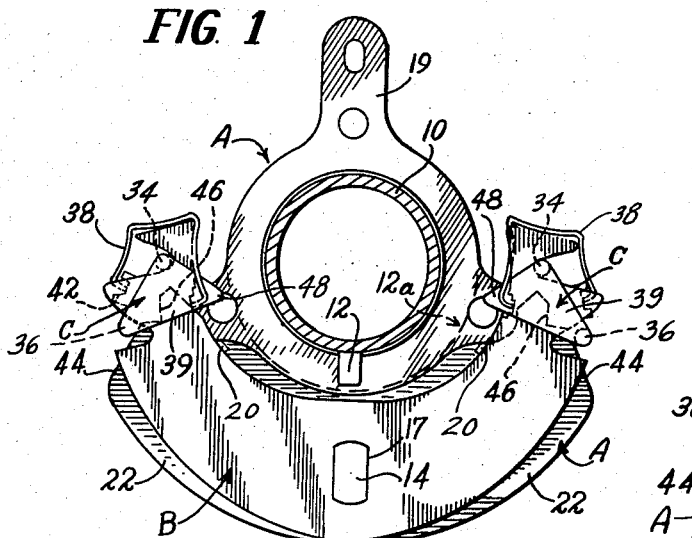
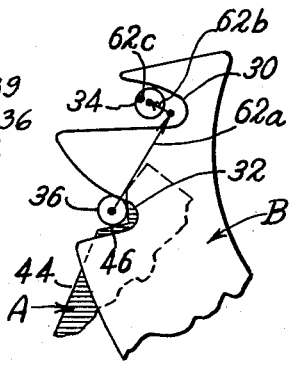
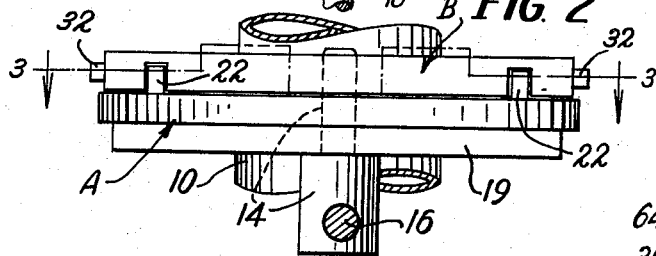
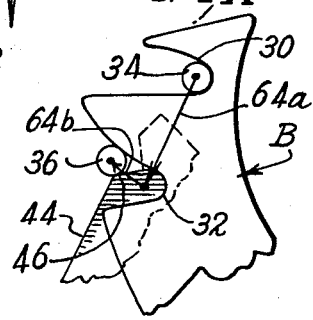
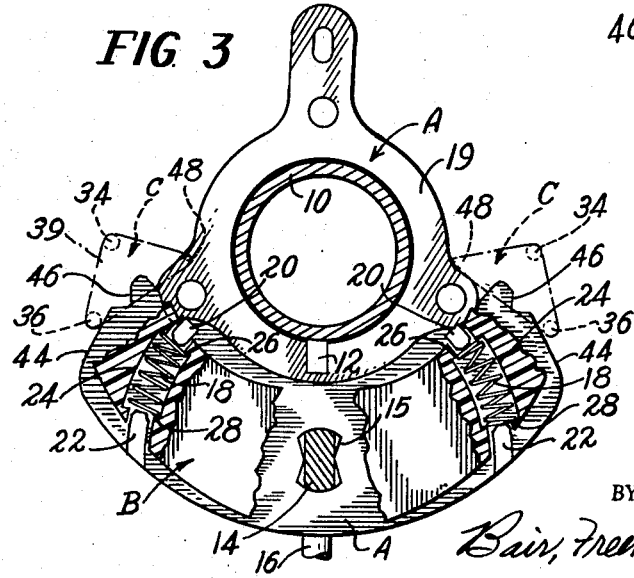
INVENTOR.
Francis C. Schmidt
BY
Bair, Freeman & Molinare
ATTYS.

July 27, 1965
F. C. SCHMIDT
3,197,586
TURN SIGNAL DEVICE HAVING A PAIR OF LATCHES EACH HAVING
TWO PROJECTIONS ENGAGEABLE WITH CORRESPONDING NOTCHES
AND A LATCH CAM ENGAGEABLE WITH A RELEASE CAM
Filed May 20, 1963
2 Sheets-Sheet 2
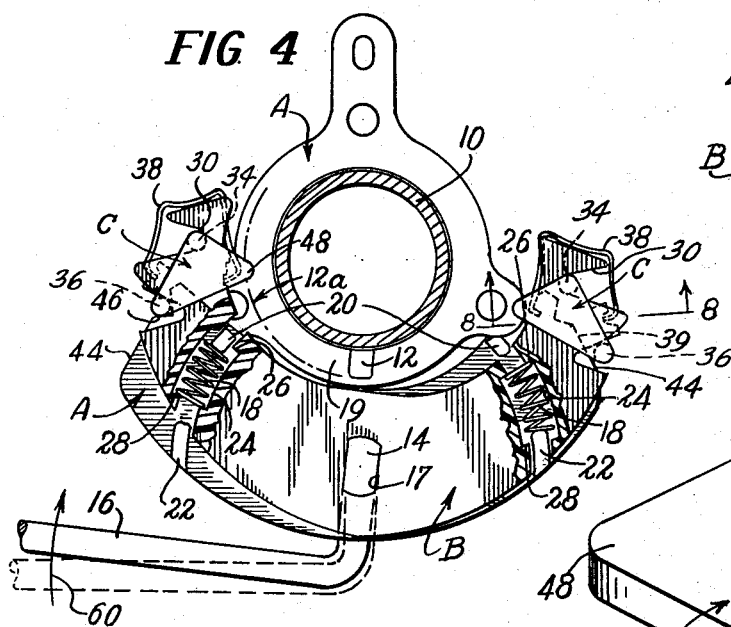
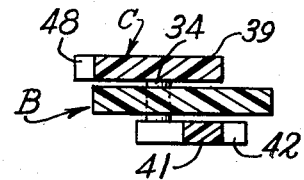
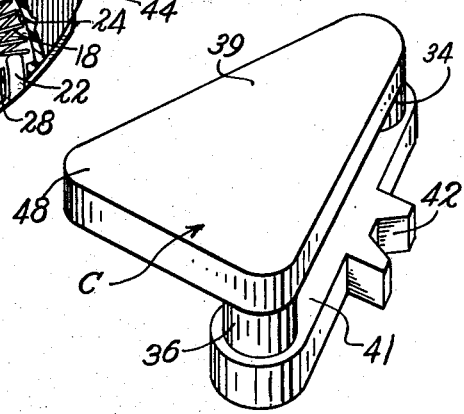
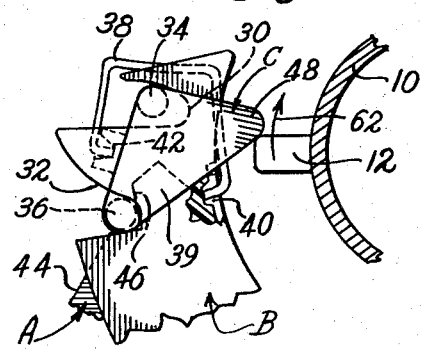
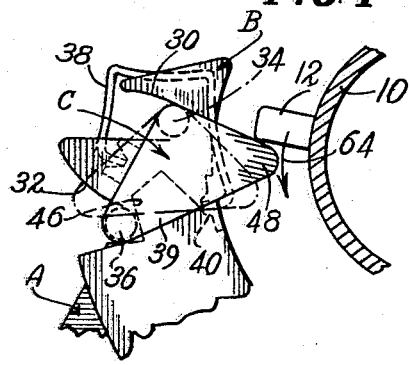
INVENTOR.
Francis C. Schmidt
BY
Bair, Freeman & Molinare
ATTYS.

3,197,586
TURN SIGNAL DEVICE HAVING A PAIR OF LATCHES EACH HAVING TWO PROJECTIONS ENGAGEABLE WITH CORRESPONDING NOTCHES AND A LATCH CAM ENGAGEABLE WITH A RELEASE CAM
Francis Charles Schmidt, Lancaster, Ohio, assignor to Essex Wire Corporation, Fort Wayne, Ind., a corporation of Michigan
Filed May 20, 1963, Ser. No. 281,482
8 Claims. (Cl. 200—61.34)

This invention relates to a turn signal for automobiles and the like having a steering shaft, the turn signal being so mounted relative to the steering shaft and a signal release cam thereon that when manually actuated for a right or left turn, it will be automatically returned to neutral position after the turn has been made and as the steering shaft is returned to straightaway position.

One subject of the invention is to provide a stationary member on which a movable member is mounted for rocking movement relative to the stationary member, a first means for latching the movable member in a rocked position in either direction from centered position and a second means operable by steering shaft rotation to release the first means.

Another object is to provide means operable to normally center the movable member relative to the stationary member with respect to the rocking movement of one relative to the other.

A further object is to provide a latching means in the form of a pair of latches, the movable member having first and second notches for each of the latches and each latch having first and second projections received in the first and second notches whereby the latches are mounted on the movable member, means being provided for biasing the projections toward the bottoms of the notches and the stationary member having a cam for each of the second projections and cam notches for receiving them when the turn signal is manually actuated, one when the movable member is rocked in one direction and the other when it is rocked in the other direction, the latches having cams which normally clear the turn signal release cam of the steering shaft but which are positioned in the path thereof when the turn signal is manually actuated so that when the steering wheel is rotated in the direction signaled, the latches will be passed by but the appropriate latch will be actuated when the steering shaft is rotated in the return direction so as to release such latch from the cam notch in which it was received to permit the movable member to return to centered position.

With these and other objects in view, my invention consists in the construction, arrangement and combination of the various parts of my turn signal, whereby the objects above contemplated are attained, as hereinafter more fully set forth, pointed out in my claims and illustrated in detail on the accompanying drawings, wherein:

FIG. 1 is a plan view axially of a steering shaft showing my turn signal mounted relative thereto;

FIG. 2 is an elevation thereof, being a projection from FIG. 1;

FIG. 3 is a horizontal sectional view on the line 3—3 of FIG. 2 to show certain internal details of construction;

FIG. 4 is a view similar to FIG. 3 showing the turn signal manually actuated for a right turn;

FIG. 5 is an enlarged perspective view of the right hand latch shown in FIG. 4;

FIGS. 6 and 7 are enlarged views similar to a portion of FIG. 4 showing latch actuation as the steering shaft is rotated right-hand and left-hand respectively;

FIGS. 6A and 7A are diagrammatic details of certain portions of FIGS. 6 and 7;

FIG. 8 is an enlarged sectional view on the line 8—8 of FIG. 4, and

FIG. 9 is an electro-diagrammatic view showing the circuits for my turn signal and the signal lights on the automobile.

On the accompanying drawings I have used the reference character A to indicate a stationary member and B a movable member. A pair of latches C are carried by the movable member as will hereinafter appear.

A steering shaft is shown at 10 having a turn signal release cam 12. The stationary member A is mounted thereadjacent by means of a flange 19 surrounding the shaft and provided with suitable openings for mounting screws or the like in a manner well known in this particular art. A rock shaft 14 of cylindrical shape having opposite sides cut flat is provided which may rock in a shaped opening 15 of the stationary member A as shown in FIG. 3, and which extends upwardly as shown dotted in FIG. 2 and fits another shaped opening 17 in the movable manner B (see FIG. 1) so that while rocking in the opening 15 it rocks the member B when an actuating arm 16 thereof is manually actuated as from the dotted line (neutral) position in FIG. 4 to the right turn position shown by solid lines.

Means is provided to normally center the movable member B relative to the stationary member A, the centered position being shown in FIGS. 1 and 2 and a rocked-to-the-right position being shown in FIG. 4. This means comprises centering springs 18 located between spring stops 20 and 22 of the stationary member A and at the same time between spring stop shoulders 26 and 28 of the movable member B as shown in FIG. 3. The movable member has spring sockets 24 to contain the springs 18. The springs 18 simultaneously engage the spring stops 20 and 22 and the spring stop shoulders 26 and 28, thereby tending to retain the movable member B in centered position.

Referring to FIG. 4 if the member B is rotated clockwise as illustrated, the left-hand spring 18 is compressed between the shoulder 28 and the stop 20 therefor whereas the right-hand spring is compressed between the shoulder 26 and the stop 22 therefor. Thus the springs tend to expand and recenter the movable member to the position shown in FIG. 3. Likewise if the member B is rocked counterclockwise, the springs 18 tend to expand and bring it back to centered position.

The movable member B, at each end thereof, has a first notch 30 and a second notch 32 best shown in FIG. 6A. Each latch C has a first projection 34 and a second projection 36 which are received in the notches 30 and 32 respectively, and a spring 38 tends to seat the projections in the notches. The spring 38 is in the form of a U-shaped wire having ends seated in notches 40 of the movable member B and in notches 42 of the latches C, and are so shaped as to tend to contract across these ends. As shown in FIG. 5 the latch C is in the form of an upper plate 39 and a lower bar 41 connected together by the projections 34 and 36. The portion of the movable member B having the notches 30 and 32 therein is located between the plate and the bar as shown in FIG. 8 whereby the latch is mounted on the movable member and held thereon by the spring 38.

The plate 39 of each latch has a latch cam 48 in the form of a projecting portion of the plate which as shown in FIG. 1 is normally out of the path of movement 12a of the steering shaft cam 12 but as shown in FIG. 4 is within such path.

Referring to FIG. 9 a typical electric circuit is shown having contacts 50 and 52 for the right-hand turn signal R and 54 and 56 for the left-hand turn signal L. The usual electric circuit includes a battery 58.

Practical operation

In the operation of my turn signal, assuming a right-hand turn is to be made, the actuating arm 16 is rocked clockwise as indicated by the arrow 60 from the dotted line position to the full line position illustrated in FIG. 4. This closes the contacts 50 and 52 of FIG. 9 for energizing the right-hand signal R and places the left-hand latch C in position for actuation by the turn signal release cam 12 of the steering shaft 10. The second projection 36 of the left-hand latch C slides upwardly along the cam 44 of the stationary member A and drops into the cam notch 46 thereof as illustrated whereas the second projection 36 of the right-hand latch C merely slides downwardly along the right-hand cam 44, the latches in both instances pivoting about their first projections 34 in the first notches 30 of the movable member B. The cooperation between the left-hand projection 36 and its notch 46 retains the member B in set position where it stays until released by unlatching.

As the steering shaft 10 rotates for a right turn as indicated by the arrow 62 in FIG. 6 the cam 12 engages the cam 48 for rocking the latch C counterclockwise about its second projection 36 in the cam notch 46 as illustrated by the arrow 62a and 62b in FIG. 6A, and it will be obvious that further right-hand rotation in FIG. 6 will tilt the latch a little further as to the dot 62c in FIG. 6A indicating the center of the final position of the first projection 34. After passage of the cam 12 the latch C is returned by the spring 38 to the position of FIG. 4 with the first projection 34 reseated in the notch 30.

Subsequently when the steering shaft 10 rotates to the left to its original straight-ahead position, the cam 12 engages the cam 48 in the manner shown in FIG. 7 for rocking the latch about its first projection 34 from the full line position to the dotted line position as indicated by the arrows 64a and 64b in FIG. 7A. This removes the second projection 36 from the notch 46 so that the centering springs 18, as soon as the projection 36 rides up on the cam 44 as shown in FIG. 7A, will return the movable member B to centered position.

The double notch and double projection construction of the movable member and the latches operates very smoothly as distinguished from those types of turn signals in which the parts are made of plastic material and depend upon spring of the material for latching and unlatching operations. The stationary and movable members as well as the latches of my structure may be made of plastic material so that the turn signal is inexpensive and yet operates without danger of breakage as there are no bending strains on the parts.

While I have shown the latches C carried by the movable member B and coacting with cams 44 and cam notches 46 of the stationary member A, the latches may instead be carried by the fixed member and the movable member provided with cams and cam notches to coact therewith. Such a reversal of parts is contemplated within the scope of my invention.

Some changes may be made in the construction and arrangement of the parts of my turn signal without departing from the real spirit and purpose of my invention, and it is my intention to cover by my claims any modified forms of structure or use of mechanical equivalents which may reasonably be included within their scope.

I claim as my invention:

1. In a turn signal, the combination comprising a steering shaft having a turn signal release cam, a stationary member, a rock shaft journaled therein, a movable member mounted on said rock shaft for rocking movement relative to said stationary member, means operable to normally center said movable member relative to said stationary member, a first means for latching said movable member in a rocked position in either direction from centered position and a second means operable by steering shaft rotation to release said first means, said first means comprising a pair of latches, one of said members having first and second notches for each of said latches, each latch having first and second projections received in said first and second notches, means biasing said projections toward the bottoms of said notches, the other of said members having a cam for each of said second projections which normally hold them spaced from the bottoms of said second notches, each of said cams having a cam notch for receiving said second projection under action of said means operable to normally center said movable member relative to said stationary member, one when the movable member is rocked in one direction and the other when the movable member is rocked in the other direction, said second means comprising each of said latches having a cam normally clear of the turn signal release cam of the steering shaft and positioned in the path thereof when said second projection is received in a cam notch, said turn signal release cam engaging said latch cam when rotated in the direction signaled to pivot said latch in one direction about its second projection in the cam notch of said other member and pass by the latch without releasing the same, and said turn signal release cam engaging said latch cam when rotating in the return direction to pivot said latch in the opposite direction about its first projection in its first notch of said one member and thereby release said second projection thereof from the cam notch in which it was received to permit said movable member to return to centered position.

2. A turn signal in accordance with claim 1 wherein said means operable to normally center said movable member relative to said stationary member comprises a pair of stops in spaced relation on said stationary member, a pair of stops in similarly spaced relation on said movable member and a spring interposed between the stops on each member and normally engaged by all of them.

3. A turn signal in accordance with claim 1 wherein each latch comprises a plate and a bar on opposite surfaces of said one member which are connected together by said projection, and said plate has a projecting edge forming said latch cam.

4. A turn signal in accordance with claim 1 wherein said means biasing said projections toward the bottoms of said notches comprises a U-shaped spring for each latch, each spring having the ends of its arms coacting with said latch intermediate said projections thereof and with said one member, said ends being biased toward each other.

5. In a turn signal, the combination comprising a steering shaft having a turn signal release cam, a stationary member, a rock shaft journaled therein, a movable member mounted on said rock shaft for rocking movement relative to said stationary member, means operable to normally center said movable member relative to said stationary member, a first means for latching said movable member in a rocked position in either direction from centered position and a second means operable by steering shaft rotation to release said first means, said first means comprising a pair of latches, said movable member having first and second notches for each of said latches, each latch having first and second projections received in said first and second notches, means biasing said projections toward the bottoms of said notches, said stationary member having a cam for each of said second projections which normally hold them spaced from the bottoms of said second notches, each of said cams having a cam notch for receiving said second projections under action of said means operable to normally center said movable member relative to said stationary member, one when the movable member is rocked in one direction and the other when the movable member is rocked in the other direction, said second means comprising each of said latches having a cam normally clear of the turn signal release cam of the steering shaft and positioned in the path thereof when said second projection is received in a cam notch, said turn signal release cam engaging said latch cam when rotated in the direction signaled to pivot said latch in one direction about its second projection in the cam notch of said stationary member and pass by the latch without releasing the same, and said turn signal release cam engaging said latch cam when rotating in the return direction to pivot said latch in the opposite direction about its first projection in its first notch of said stationary member and thereby release said second projection thereof from the cam notch in which it was received to permit said movable member to return to centered position.

6. A turn signal in accordance with claim 5 wherein said means operable to normally center said movable member relative to said stationary member comprises a pair of stops in spaced relation on said stationary member, a pair of stops in similarly spaced relation on said movable member and a spring interposed between the stops on each member and normally engaged by all of them.

7. A turn signal in accordance with claim 5 wherein each latch comprises a plate and a bar on opposite surfaces of said one member which are connected together by said projection, and said plate has a projecting edge forming said latch cam.

8. A turn signal in accordance with claim 5 wherein said means biasing said projections toward the bottoms of said notches comprises a U-shaped spring for each latch, each spring having the ends of its arms coacting with said latch intermediate said projection thereof and with said movable member, said ends being biased toward each other.

No references cited.

BERNARD A. GILHEANY, *Primary Examiner.*